United States Patent [19]
Harvey et al.

[11] Patent Number: 5,156,795
[45] Date of Patent: Oct. 20, 1992

[54] METHOD OF SHAPING BLANKS OF THERMOFORMABLE MATERIAL

[75] Inventors: Martin T. Harvey, Welwyn, England; Donald W. Stobbe, Phoenix, Ariz.; James B. Cattanach, North Yorkshire, England

[73] Assignee: Imperial Chemical Industries PLC., England

[21] Appl. No.: 349,664

[22] Filed: May 10, 1989

[51] Int. Cl.[5] ............................................... B29C 43/02
[52] U.S. Cl. .................................... 264/510; 264/546; 264/316
[58] Field of Search .............. 264/510, 512, 546, 313, 264/314, 316, 553, 552

[56] References Cited

U.S. PATENT DOCUMENTS

| | | | |
|---|---|---|---|
| 2,978,376 | 4/1961 | Hulse | 264/510 |
| 3,140,325 | 7/1964 | Graff | 264/510 |
| 3,442,996 | 5/1969 | Fisher et al. | 264/546 |
| 3,615,979 | 10/1971 | Davis, Sr. et al. | 156/87 |
| 3,734,814 | 5/1973 | Davis, Sr. et al. | |
| 3,962,392 | 6/1976 | Conner, Jr. | 264/546 |
| 4,478,771 | 10/1984 | Schreiber | 264/510 |
| 4,629,650 | 12/1986 | Kataoka | 428/213 |

FOREIGN PATENT DOCUMENTS

| | | |
|---|---|---|
| 0056703 | 7/1982 | European Pat. Off. |
| 0102158 | 3/1984 | European Pat. Off. |
| 0155820 | 9/1985 | European Pat. Off. |
| 0195561 | 9/1986 | European Pat. Off. |
| 0195562 | 9/1986 | European Pat. Off. |
| 0202041 | 11/1986 | European Pat. Off. |
| 1131871 | 6/1962 | Fed. Rep. of Germany |
| 1196362 | 7/1965 | Fed. Rep. of Germany |
| 1932167 | 3/1976 | Fed. Rep. of Germany |

OTHER PUBLICATIONS

O'Bradaigh et al, "Effect of Forming Temperature on the Properties of Polymeric Diaphragm Formed Components", ASC/CCM Joint Symposium on Composite Materials Science and Engineering, Sep. 23-25, 1987, University of Delaware.

O'Bradaigh et al, "Effects of Forming Rate on Polymeric Diaphragm Forming of Thermoplastic Composites", Composites Manufacturing Science Laboratory, University of Delaware, Apr. 1988.

*Primary Examiner*—Jill L. Heitbrink

[57] ABSTRACT

A method of shaping a thermoformable composite material including a polymeric matrix reinforced with continuous filaments which involves locating the material in overlapping relationship with at least one diaphragm of a thermoformable shaping polymer, heating the assembly to a suitable thermoforming temperature and shaping the assembly against a shaping tool surface in a shaping step of less than two minutes.

9 Claims, 1 Drawing Sheet

METHOD OF SHAPING BLANKS OF THERMOFORMABLE MATERIAL

This invention relates to a method of shaping blanks of thermoformable material.

The invention particularly relates to a rapid method of shaping (otherwise referred to as "forming") bodies of thermoformable material containing continuous reinforcing filaments, especially where the resulting shaped article is one having a compound curvature.

Methods of impregnating continuous, usually collimated, fibres with polymeric materials, particularly thermoplastics, to form composite materials having high fibre to polymer ratios have been devised thereby enabling the exceptionally good physical properties of the reinforcing fibres, for example glass or carbon fibres, to be fully utilised in the composite materials (e.g. see EP-B-0056703 and EP-A-102158). Such composite products can be produced as continuous profiles by appropriate profiling of the impregnated product, but are generally produced as prepregs of flat tapes or sheets which are subsequently laid up and consolidated into flat structures having multi-directional reinforcement to provide quasi-isotropic reinforcement in the plane of the structure. Such consolidated structures have exceptional strength and stiffness but, owing to the nature of the continuous fibre reinforcement, are difficult to fabricate into shaped articles in processes having shaping steps in which the laid-up prepregs are subjected to elongation or compression.

To overcome such difficulties, the use of auxiliary sheet material which is itself capable of being plastically deformed at elevated temperatures in conjunction with the laid-up prepregs has been adopted. In that method, the sheet material is urged against at least one face of the body, i.e. the laid-up prepregs (either consolidated or unconsolidated), whilst the assembly so formed is at a temperature at which the sheet is plastically deformable and the body will conform to the shape of the sheet. The sheet is then plastically deformed so as to form the body into the desired shape. The term commonly adopted for such shaping sheets is "diaphragm". Normally, two diaphragms are used conjointly, one to contact each side of a body.

The diaphragms can, for example, be in the form of a suitably deformable metal. Thus EP-B-0155820 discloses a method of forming such composites in which fluid pressure is applied to a diaphragm of plastically deformable metal to urge a body of composite into a required shape. Preferably the metal is a super-plastically deformable metal. A method of shaping composite material using diaphragms of polymeric material is described in EP-A-195562.

Hitherto, the general practice in the shaping of composite materials has been to use slow rates of shaping and concomitant extended times for the shaping step. This practice has been thought to be unavoidable in that the nature of the composite materials made it essential to use slow rates of shaping so as to permit re-arrangement of the reinforcing fibres relative to one another and also to the polymer matrix. (For example, see papers entitled "Effect of Forming Temperature on the Properties of Polymeric Diaphragm Formed Components", C M O'Bradaigh & P J Mallon, ASCM/CCM Joint Symposium on Composite Materials Science & Engineering, Sep. 23-25, 1987 University of Delaware, USA—see particularly section on Process Cycles and reference to "gentle forming"— and "Effects of Forming Rate on Polymeric diaphragm Forming of Thermoplastic Composites", C M O'Bradaigh, M F Fleming, P J Mallon, R B Pipes at page 21-1 of the proceedings of an Automated Composites Conference, held Sep. 26-28, 1988 at Leeuwenhorse Congress Centre, Holland published on behalf of the Plastics & Rubber Inst, London.—see particularly Results & Discussion section which concludes slower forming rates are preferred). consequently the body of composite material (whether or not in conjunction with a diaphragm in a thermoformable assembly) was inevitably in contact with the shaping tool for a considerable time and it was necessary for the tool to be pre-heated to an appropriate temperature so as to minimise loss of heat from the body during the shaping step. Some of the best composite materials (for example, the Aromatic Polymer Composites (APC) sold by ICI PLC) have high melting points, for example 400° C. or 430° C., and they require correspondingly high forming temperatures to shape them satisfactorily. Therefore, according to the conventional practice it has been necessary not only to preheat the body, and the or each diaphragm when used, but also to heat the shaping tool to a similar temperature. As the tool is normally an article of substantial thermal capacity this preheating has been time-consuming and together with the cooling required at the end of the shaping step has amounted generally to a total time considerably greater than that required for the shaping step alone. The use of slow rates of shaping combined with high temperatures has caused a further problem with regard to possible accidental degradation of the polymers.

By way of illustration, reference is made to the above-mentioned papers and to the following prior art methods for typical times used in shaping thermoformable assemblies comprising a blank of composite material located between two diaphragms.

In the shaping method disclosed in EP-B-0155820, a typical shaping cycle consists of the following component stages:

| | |
|---|---|
| 1. pre-heating of the thermoformable assembly and shaping tool: | at least 4 minutes |
| 2. shaping of the thermoformable assembly: | at least 18 minutes (including dwell at maximum pressure) |
| 3. cooling of the tool and resulting shaped product: | 20 to 90 minutes. |

In the shaping method disclosed in EP-A-195562, a typical shaping cycle consists of the following component stages:

| | |
|---|---|
| 1. pre-heating of the thermoformable assembly and shaping tool: | at least 2 minutes |
| 2. shaping of the thermoformable assembly: | at least 4 minutes (including dwell at maximum pressure) |
| 3. cooling of tool and resulting shaped product: | at least 10 minutes. |

Thus, this latter shaping cycle, using a polymeric material diaphragm, is very much less than that of the method of EP-B-0155820, using a super-plastically deformable metal diaphragm, and, as such, is satisfactory for production of high-value shaped products. Nevertheless, the cycle time is substantial and thus is not well suited for the product on a large scale of products to be sold at modest prices.

It will be seen from the typical shaping cycle times of the prior disclosures that the pre-heating and cooling stages comprises a substantial portion of the shaping cycle. This is because, in the prior art methods, in operating at or above 400° C., a considerable amount of heat is required to bring both thermoformable assembly and the tool up to that temperature prior to shaping and, in consequence, a considerable amount of heat has to be dissipated after the shaping before the thermoformed assembly is removable therefrom.

The Applicants have found that, contrary to previous belief, it is not necessary to use slow rates of forming and that satisfactory shaped products can be obtained using forming times which are only a fraction of those previously employed. In preferred embodiments, the pre-heating of the shaping tool to a temperature corresponding to the forming temperature of the thermoformable assembly is no longer necessary because the time during which the thermoformable assembly is in contact with the tool is sufficiently short for the loss of heat, if any, to the tool not to be detrimental to the shaping method as a whole.

Thus, according to the invention, a method of shaping a body of thermoformable material containing continuous filaments comprises making a thermoformable assembly of the body and at least one polymeric shaping diaphragm, heating the assembly to a suitable thermoforming temperature, forming the assembly by urging the assembly into contact with a shaping surface of a shaping tool and removing the resultant shaped body from the tool, characterised in that said step of forming the assembly does not exceed two minutes.

The rates at which the forming step is carried out in accordance with the invention are exemplified below.

In the forming step, when the assembly is urged against the shaping surface of the tool using air or other gas pressure, the rate at which the forming is done is conveniently not more than 2 minutes, for example 100, 80 or 60 seconds. In the forming step, when the assembly is urged against the shaping surface of the tool using mechanical means, for example matched dies, the rate of which the forming is done is conveniently not more than 1 minute, for example, 40, 30, 20, 15, 10 or 5 seconds. In favourable circumstances, the rate can be as little as 1 or 2 seconds.

The rate at which the forming is done in the present invention should be fast enough to shape the body while it remains at a suitable temperature but slow enough to allow interply slip and intraply reorganisation of reinforcing fibres without viscous drag and/or turbulent flow disrupting general columnation or planar organisation of the fibres. This depends upon the thermal capacity of the blank (which in turn depends inter alia on its thickness, heat transfer and geometry-controlled viscous flow).

The method of the invention can be used to produce, for example, shaped articles having simple or compound curvature. Simple or single curvature is the shape obtained when a planar member is bent about a linear axis; compound curvature is the shape obtained when a planar member is bent about at least two non-parallel linear axes.

In the forming step, the conditions used can be, for example, vacuum, pressure, (differential pressure across the assembly preferably does not exceed about 10 atm) fluid or mechanical, separately or conjointly; the choice of conditions depending to some extent at least on the desired maximum time (the "forming time") for the forming step. In order to obtain short forming times, it is convenient to adopt a mechanical shaping means, for example a matched die.

The method of the invention will, in general, involve the use of two diaphragms, one on each side of the blank but the invention also includes the use of a single diaphragm where the subsequent forming is to be by a process in which such an assembly is applicable. Usually, the diaphragm or diaphragms are removed from the shaped body following forming, but in some instances it or they may be left adhered to the shaped body. The diaphragm can be of any suitable polymeric material; for example it can be a material disclosed in EP-A- 0 195 561. Suitable polymers are, for example, polyetheretherketones, polyetherethersulphones, polyimides, polypropylenes (or other polymeric alphaolefines) and polyamides.

The forming step involves the shaping of two materials, i.e. the diaphragm material and the composite, exhibiting very different visco/elastic deformation modes at the forming temperature. The diaphragms should normally exhibit a large element of elastic behaviour (e.g. strain hardening) whilst viscous flow in the matrix material facilities intraply slip and intraply reorganisation. The elastic behaviour of the diaphragms thus dominates the viscous flow of the matrix materials.

The polymer of the diaphragm will normally have a minimum forming temperature above that of the polymer of thermoformable body so that the resistance to deformation at a given temperature in the process of forming the thermoformable assembly is dominated by the polymer of the diaphragm; but this requirement can also be achieved if the two polymers have the same minimum forming temperature. For example, if the diaphragm is of the same polymer type as that of the polymer of the thermoformable body but is of higher molecular weight or is thicker than the polymer of thermoformable body, then the higher molecular weight or thicker diaphragm can be used to dominate the process and control the forming.

The minimum forming temperature of a thermoplastic polymer is the temperature at which it can be uniformly stretched by at least 20%. In general such a temperature will be at least 20° C. above the glass transition temperature of the polymer and below the decomposition temperature.

When the polymer materials of the themoformable body and the diaphragm are amorphous polymers, the glass transition temperature of the polymer of the diaphragm should preferably be higher than that of the polymer of the thermoformable body and the forming operation should be carried out above the Tg of the polymer of the diaphragm. If both materials are crystalline, the forming operation should preferably be carried out at a temperature above the melting point of the polymer of the diaphragm and the polymer of the thermoformable body should have a melting point lower than that of the polymer of the diaphragm.

Conveniently, the polymeric material of the diaphragms is preferably amorphous, of high molecular weight and, conveniently, lightly cross linked, with broad processing temperature; whilst the matrix polymer is preferably a material having a sharp softening (melting) point and a low viscosity flow at the forming temperature as, for example, in a low molecular weight semi-crystalline polymer.

Radiant heat, for example, can be used to heat the thermoformable assembly. When the forming step utilises the application of vacuum, it may be expedient to pre-heat the vacuum adapter to the same or a similar temperature to that of the thermoformable assembly, and in such instances it may be convenient to assemble the thermoformable assembly and vacuum adapter prior to the radiation heating.

The temperature adopted for the tool in the method of the present invention depends, to some extent at least, on the forming time and the difference between the surface temperature of the thermoformable assembly and the temperature of the surface of the tool in contact with the thermoformable assembly, but a suitable temperature for the tool can readily be arrived at.

In preferred embodiments of the invention, it is preferred that the temperature difference is not less than 50° C. Thus, for example, the temperature of the shaping surface of the tool can be 100°, 150°, 200° or even more below the temperature of the thermoformable assembly, depending on the temperature of the latter. Where the shaping method is carried out on a high volume basis it may be that the slight temperature loss from successive thermoformable assemblies as they come in contact with the tool is sufficient to maintain the tool temperature at a desired value. However, even where it is necessary to provide some heat so as to maintain the temperature of the tool at the desired value the heat required is much less than that necessary in the conventional practice.

The body of the thermoformable material is conveniently a thermoformable planar sheet or sheets of composite material. However, the body can, if desired, comprise an uncured thermosettable polymer or precursor therefor. Where the body comprises a thermoplastic polymer it can, for example, be a polypropylene or other polyolefine, polyketones, polyetherketones, polyetherketoneketones, polyetheretherketones, polyesters polyamides and amorphous polymers such as polyethersulphones.

The body can be, for example, in unconsolidated or consolidated form. Thus, it can for instance comprise an unconsolidated stack of plies or a preconsolidated sheet. Consolidation of an unconsolidated stack or maintaining consolidation of a preconsolidated sheet can be effected by applying pressure or other consolidation force, for example by evacuating the space between the diaphragms thereby excluding air from between the unconsolidated plies and from between the body and diaphragms and providing up to, say, 1 atmosphere consolidated pressure to the thermoformable assembly by atmospheric pressure acting on the diaphragms. Optionally, additional consolidation pressure can be provided by increasing the pressure on the diaphragms, for example a pressure up to 2 atmospheres, or even 5 or 10 atmospheres where appropriate.

Whilst it is preferred that the continuous fibres are present in the reinforced thermoformable body as continuous collimated fibres, preferably extending the width and length of the body to be shaped, the invention includes the use of random fibre-reinforced bodies having randomly disposed fibres, providing the fibres are at least 20 mm long.

The invention is also useful in producing shaped articles in a method using a plurality of superimposed layers of parallel, collimated, continuous filaments in a thermoplastic matrix, in which the continuous filaments have been severed in predetermined positions, thereby facilitating the ease with which the layers can be formed into a shaped article. The position of the cuts in the continuous filaments can, for example, be predetermined so that on shaping which results in slippage of the layers of filaments, discontinuities in the filaments occur in regions of the article which are reinforced with adjacent continuous fibres and that there is no overlap of adjacent discontinuous regions. One such process of forming articles from prepregs having predetermined severance lines is described in EP-A-202041.

The term "vacuum" as used herein includes air removal to an extent normally adequate for acceptable consolidation of the blank. The vacuum is preferably a gauge pressure of not more than 28 inches mercury, especially not more than 25 inches mercury. The pressures referred to are all gauge pressures. If desired, state of the art evacuated lamination techniques can be incorporated in the sandwich. For example, woven glass "breather" cloths can be used to facilitate air passage and to accommodate residual air away from the surface region of the blank.

The invention will now be illustrated by reference to the following Examples. The method of the invention will also be described in some of the Examples to illustrate the invention by way of example only with reference to the accompanying drawings, in which.

Figure 1:
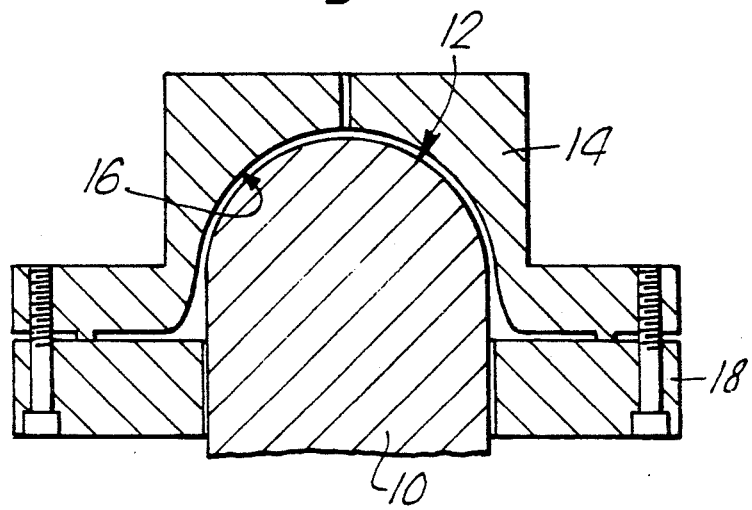
FIG. 1 is a schematic front elevation in cross section of a die.

The meanings of abbreviations used in the Examples are as follows:

| | |
|---|---|
| PEEK = | polyetheretherketone |
| PP/GF = | composite material comprising a matrix of polypropylene containing glass fibres as reinforcement. |
| Upilex R = | a polyimide film produced by Ube Industries Ltd and sold by ICI PLC. |
| APC = | a product sold by ICI PLC under the trade name Aromatic Polymer Composite |
| APC(HTX) = | a product sold by ICI PLC under the trade name Aromatic Polymer Composite based on a semi-crystalline polymer having a Tg of about 205° C. |
| APC2 = | a product sold by ICI PLC under the trade name Aromatic Polymer Composite based on PEEK reinforced with carbon fibres. |
| AS4 = | a high strength carbon fibre sold by Hercules |
| IM7 = | an intermediate modulus carbon fibre sold by Hercules |

EXAMPLE 1

A quasi-isotropic lay-up body comprising 51 unconsolidated plies of APC2/AS4 PEEK/carbon fibre prepreg tape, each ply having a thickness of 0.005 inch, (0.127 mm), was placed between two diaphragms each being a sheet of "Uplilex R" 0.005 inch (0.127 mm) thick and each being substantially larger in area than the lay-up. There was thus produced a thermoformable assembly in the form of a "sandwich" for shaping. The diaphragms were then positioned respectively on each side of a peripheral vacuum manifold and the assembly was clamped into a thermoforming machine such that a vacuum drawn through the manifold evacuate the volume between the diaphragms, thus providing approximately 14 psi (0.97 bar) consolidation pressure to the blank.

While maintaining the vacuum, the assembly was moved to a first station comprising a position midway between, and parallel to, two banks of radiant heaters rated at approximately 6 kW/sq ft (64.59 KW/m$^2$. The temperature, monitored by a thermocouple placed in the middle of the ply pack rose to 399° C. in approximately 3 minutes. The clamping frame and heated assembly were then moved quickly from the first station and out of the radiant heat to a second station for shaping, the move being completed in 2 seconds. Here the sandwich assembly was vacuum formed rapidly (2 seconds) over an aluminium tool preheated to 204° C. The shape of the tool was such that the sandwich was converted from a planar sheet form to an L-shaped sheet form. After being allowed to cool well below the melting point of the matrix resin (339° C.), the vacuum was released, the sandwich was removed from the machine and the diaphragms stripped off to leave a well-consolidated, shaped article which was free from voids and which replicated the contours of the tool. It appeared that shaping of an ostensibly non-elastic body material had been achieved by interply slippage and intra-ply reorganisation of fibres without appreciable fibre breakage or excessive wrinkling.

EXAMPLE 2

Example 1 was repeated except that instead of a lay-up of 51 plies there was used a lay-up of 19 plies.

The resulting shaped product was a fully consolidated shaped article which replicated the contours of the tool.

EXAMPLE 3

Example 1 was repeated except that instead of a lay-up of 51 plies there was used a lay-up of 11 plies.

The resulting shaped product was a fully consolidated shaped article which replicated the contours of the tool.

EXAMPLE 4

The method of Example 1 was repeated but using 4 plies and, instead of the tool of that Example, a tool which converted the planar body into a compound curvature moulding in the form of a bowler hat (i.e. the moulding consisted of a hollow cylinder having a closed base and an annular radially outwardly extending flange at its open end) and the assembly and the tool were heated in an autoclave to substantially the same temperature before rapidly forming the assembly.

The resulting shaped product was a fully consolidated, shaped article which replicated the contours of the tool.

EXAMPLE 5

Example 4 was repeated except that instead of a lay-up of 4 plies there was used a lay-up of 19 plies.

The resulting shaped product was a fully consolidated shaped article which replicated the contours of the tool.

EXAMPLE 6

Example 4 was repeated except that instead of a lay-up of 4 plies there was used a lay-up of 11 plies.

The resulting shaped product was a fully consolidated shaped article which replicated the contours of the tool.

EXAMPLE 7 to 12

Examples 1 to 6 were repeated but with the following differences; instead of APC2/AS4 there was used as the blank the more viscous APC(HTX)/IM7; in this case a "pressure box" was located over the heated assembly to enable the pressure differential across the assembly to be increased from approximately 14 psi (0.97 bar) to approximately 50 psi (3.45 bar) to assist in consolidating the assembly against the tool

EXAMPLE 13

In this Example, the shaping was effected using a matched die (illustrated in FIG. 1 of the accompanying drawings). The die comprises a male member 10 (plug tool) having a hemi-spherical moulding surface 12 of diameter 4.0 inches (101.6 mm) and a corresponding female member 14 (cavity die) having a hemi-spherical moulding surface 16 of diameter 4.279 inches (108.7 mm). The radial clearance, therefore, between the two members 10,14 was 0.139 inch (3.53 mm).

The body used in this Example comprised a 6 inch (152.4 mm) diameter quasi-isotropic lay-up of 16 unconsolidated plies of PP/GF prepreg having a nominal Vf of 35%, surrounded by, and in edge-to-edge contact with, an annular inch (12.7 mm) wide band of glass fibre mat and two diaphragms of amorphous PEEK having a thickness of 0.005 inch (0.127 mm). The diaphragms were of a diameter of 9 inches (228.6 mm) and the lay-up and glass fibre band were centrally located with respect to and sandwiched between the two diaphragms.

The assembly located between the cavity die 14 and associated press ring 18, together with the plug tool 10 were heated to a temperature of 177° C. in an air oven at a first station and then transferred to a second station where the cavity die 14 and the plug tool 10 were assembled and forced together, to the position shown in FIG. 1, to form the assembly into the desired shape.

The forming was effected using a clamping load of 2.5 tons (1000 psi (68.97 bar) clamp rim pressure) in a Muller doubled action press.

The time for the actual forming step was only 21 seconds. In spite of this rapid forming, the resulting shaped product was fully formed, with a clear venthole (cavity die vent) witness; both surfaces were smooth and glossy; and the evident controlled lateral spread of the fibres was very good. Moreover, both diaphragms had survived the shaping intact.

EXAMPLE 14

The method of Example 13 was repeated through with the following differences:

(a) the lay-up consisted of two pre-consolidated sheets each having a diameter of 7 inches (177.8 mm)

(b) no glass mat was used.

The forming step took only 17 seconds. In spite of this rapid forming the resulting shaped product was fully formed, with a clear venthole (cavity die vent witness; both surfaces were smooth and glossy; and the evident controlled lateral spread of the fibres was very good.

EXAMPLE 15

Figure 2:
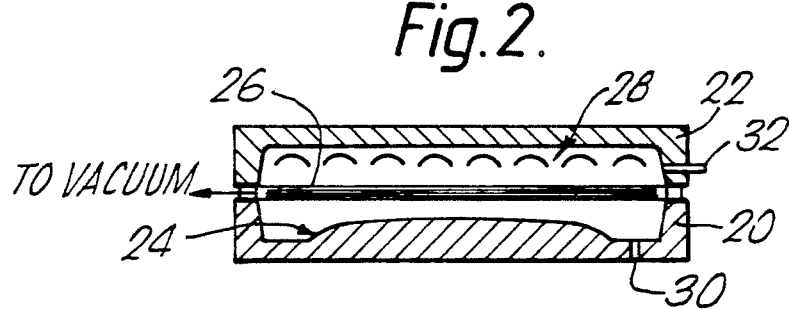
FIGS. 2 and 3 are, respectively, schematic front and side elevations of mould.
Figure 3:
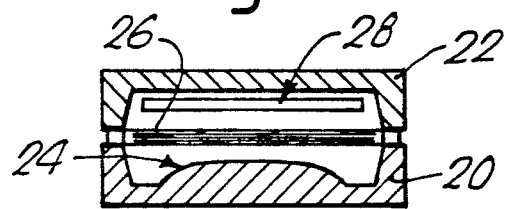

In this Example, the shaping was effected using mould illustrated in FIGS. 2 and 3 of the accompanying drawings. The mould comprises two cavities 20, 22; the lower cavity 20 has a male moulding surface 24 against which the assembly 26 is forced to be formed and the upper cavity 22 houses an infra-red heater array 28. Means (not shown) press the two cavities 20, 22 together to sandwich the thermoformable assembly 26 therebetween during the shaping operation. The lower cavity 20 has a vent 30 and the upper cavity 22 has a pressure connection 32 whereby the upper cavity 22 is pressurisable.

The body used in this Example comprised a 16.5×22 inch (419×559 mm) lay-up of eight 0°/90° piles of APC2 which were sandwiched unconsolidated between two larger "Upilex R" 0.005 inch (0.127 mm) thick diaphragms to form the assembly 26. The edges of the diaphragms were sealed to a frame and the resultant sandwich was evacuated.

The lower cavity 20 was heated to 250° C.

The assembly 26 was then slid between the parted mould cavities 20, 22 and the heater array 28 was switched on. After 2 minutes, the interior of the assembly had reached the forming temperature of 400° C.

The cavities 20, 22 were then pressed together to trap the peripheries of the diaphragms between them and full line pressure of 90 to 100 psi (6.24 to 6.93 bar) was applied to the upper cavity via the connection 32 for approximately 12 seconds to force the assembly into the lower cavity 20 and against the surface 24 to be formed thereby, the heater array 28 being switched off.

The mould and the shaped assembly were allowed to cool for 8 minutes (experience showed this could be reduced considerably, say to 2 minutes, if desired) following which the assembly 26 was then removed from the mould.

The forming step only took approximately 12 seconds, but, despite this rapid forming, a fully consolidated shaped article which replicated the contours of the tool was obtained.

EXAMPLES 16 to 21

Example 15 was repeated but with the following differences:

Examples 16 to 19: the lower cavity 20 was heated to 270° C.

Examples 20 and 21: the lower cavity 20 was heated to 290° C.

In each instance, a fully consolidated shaped article was obtained.

We claim:

1. A method of shaping a body of reinforced thermoformable material comprising:
   (a) forming said body from continuous reinforcing filaments and a thermoplastic matrix material;
   (b) selecting a thermoplastic shaping diaphragm having a minimum forming temperature which is not less than the minimum temperature at which said thermoplastic material of said body can be formed;
   (c) forming an assembly by contracting at least one surface of said body with at least one said diaphragm;
   (d) heating said assembly to a temperature at which said diaphragm can be formed;
   (e) applying a differential pressure between opposite sides of said assembly to urge said assembly into contact with a shaping surface of a shaping tool thereby to form said body into a shape conforming to the shape of said tool, said step (e) not exceeding two minutes; and
   (f) removing said formed assembly from said tool.

2. A method according to claim 1 wherein, during said step (e), the temperature of said surface is less than the temperature of the side of said assembly which engages said tool.

3. A method according to claim 2, wherein when said assembly is urged into contact with said surface, the temperature of said surface is less than the temperature of the side of said assembly which engages said tool by at least 50° C.

4. A method according to claim 2 or claim 3, wherein, when said assembly is urged into contact with said surface, the temperature of said surface is less than the temperature of the side of said assembly which engages said tool by at least 100° C.

5. A method according to claim 1 wherein, said assembly is made by locating said body between two said diaphragms.

6. A method according to claim 1 wherein, after removal of said body from said tool, said at least one diaphragm is removed from said body.

7. A method of shaping a body of reinforced thermoformable material comprising:
   (a) forming said body from continuous reinforcing filaments and a thermoplastic matrix material;
   (b) selecting a thermoplastic shaping diaphragm having a minimum forming temperature which is not less than the minimum temperature at which said thermoplastic material of said body can be formed;
   (c) forming an assembly by locating said body between two of said diaphragms;
   (d) restraining said diaphragms about their peripheries, said body being unrestrained between said diaphragms;
   (e) heating said assembly to a temperature at which said diaphragms can be formed;
   (f) applying a differential pressure between opposite sides of said assembly to urge said assembly into contact with a shaping surface of a shaping tool thereby to form said body into a shape conforming to the shape of said tool, said step (f) not exceeding two minutes; and
   (g) removing said formed assembly from said tool.

8. A method of shaping a body of reinforced thermoformable material comprising:
   (a) forming said body from prepregs of continuous, collimated reinforcing filaments in a thermoplastic matrix material, said prepregs being laid up to give multidirectional reinforcement;
   (b) selecting a thermoplastic shaping diaphragm having a minimum forming temperature which is not less than the minimum temperature at which said thermoplastic material of said body can be formed;
   (c) forming an assembly by contacting at least one surface of said body with at least one said diaphragm;
   (d) heating said assembly to a temperature at which said diaphragm can be formed;
   (e) applying a differential pressure between opposite sides of said assembly to urge said assembly into contact with a shaping surface of a shaping tool thereby to form said body into a shape conforming to the shape of said tool, said step (e) not exceeding two minutes; and
   (f) removing said formed assembly from said tool.

9. A method of shaping a body of reinforced thermoformable material comprising:
   (a) forming said body from prepregs of continuous, collimated reinforcing filaments in a thermosetting matrix material, said prepregs being laid up to give multidirectional reinforcement;
(b) selecting a thermoplastic shaping diaphragm having a minimum forming temperature which is not less than the minimum temperature at which said thermosetting material of said body can be formed;
(c) forming an assembly by contacting at least one surface of said body with at least one said diaphragm;
(d) heating said assembly to a temperature at which said diaphragm can be formed;
(e) applying a differential pressure between opposite sides of said assembly to urge said assembly into contact with a shaping surface of a shaping tool thereby to form said body into a shape conforming to the shape of said tool, said step (e) not exceeding two minutes; and
(f) removing said formed assembly from said tool.